(12) United States Patent
Liebling

(10) Patent No.: US 7,571,050 B2
(45) Date of Patent: Aug. 4, 2009

(54) TRANSIT-COORDINATED LOCAL SEARCH

(75) Inventor: Daniel J. Liebling, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 500 days.

(21) Appl. No.: 11/391,129

(22) Filed: Mar. 27, 2006

(65) Prior Publication Data

US 2007/0225903 A1   Sep. 27, 2007

(51) Int. Cl.
*G06F 17/30* (2006.01)
(52) U.S. Cl. .................................. 701/209; 701/201
(58) Field of Classification Search ........... None
See application file for complete search history.

(56) References Cited

U.S. PATENT DOCUMENTS

| | | | | |
|---|---|---|---|---|
| 5,906,654 | A * | 5/1999 | Sato .................... | 701/210 |
| 5,948,040 | A * | 9/1999 | DeLorme et al. ........ | 701/201 |
| 5,978,733 | A | 11/1999 | Deshimaru et al. | |
| 6,175,800 | B1 | 1/2001 | Mori et al. | |
| 6,421,606 | B1 | 7/2002 | Asai et al. | |
| 6,434,482 | B1 * | 8/2002 | Oshida et al. ............ | 701/209 |
| 6,553,310 | B1 | 4/2003 | Lopke | |
| 6,871,137 | B2 * | 3/2005 | Scaer et al. ............. | 701/200 |
| 6,980,982 | B1 | 12/2005 | Geddes, Jr. et al. | |
| 2002/0049742 | A1 | 4/2002 | Chan et al. | |
| 2003/0036848 | A1 * | 2/2003 | Sheha et al. ............. | 701/209 |
| 2004/0054428 | A1 * | 3/2004 | Sheha et al. ............. | 700/56 |
| 2004/0204837 | A1 * | 10/2004 | Singleton ............... | 701/209 |
| 2005/0004757 | A1 * | 1/2005 | Neeman et al. ........... | 701/210 |
| 2005/0108213 | A1 | 5/2005 | Riise et al. | |
| 2005/0130671 | A1 | 6/2005 | Frank et al. | |
| 2005/0240344 | A1 * | 10/2005 | Tomita et al. ............ | 701/211 |
| 2005/0240512 | A1 | 10/2005 | Quintero et al. | |
| 2005/0262062 | A1 | 11/2005 | Xia | |
| 2006/0004713 | A1 | 1/2006 | Korte et al. | |
| 2006/0036583 | A1 | 2/2006 | Sondergaard et al. | |
| 2006/0241857 | A1 * | 10/2006 | Onishi et al. ............ | 701/202 |

(Continued)

FOREIGN PATENT DOCUMENTS

JP          9-33274     *   2/1997

(Continued)

OTHER PUBLICATIONS

"A2BFind What's Nearby, Anywhere on Earth", Available at http://a2b.cc/help-positioning-gislbs.a2b, accessed Feb. 24, 2006.

(Continued)

*Primary Examiner*—Michael J. Zanelli
(74) *Attorney, Agent, or Firm*—Lee & Hayes, PLLC

(57) ABSTRACT

Various embodiments can provide helpful information to a user who is looking for a particular point of interest. In at least some embodiments, first and second searches are conducted. The first search uses a local search provider and produces results which describe one or more points of interest relative to a location, such as a user's current location. Each point of interest can be associated with a destination location to which the user would like to travel. The second search uses a so-called transit route provider and utilizes the results of the first search to plan a transit route between the location and one or more of the respective destination locations.

20 Claims, 4 Drawing Sheets

U.S. PATENT DOCUMENTS

2006/0265294 A1* 11/2006 de Sylva .................. 705/28

FOREIGN PATENT DOCUMENTS

| | | | |
|---|---|---|---|
| JP | 2003-214885 | * | 7/2003 |
| JP | 2003-344075 | * | 12/2003 |
| KR | 20010109855 A | | 12/2001 |
| KR | 20050057933 A | | 6/2005 |
| KR | 20050122796 A | | 12/2005 |
| KR | 20060006271 A | | 1/2006 |
| WO | WO2005106714 | | 11/2005 |

OTHER PUBLICATIONS

Jakob et al., DCbot: Exploring the Web as Value-Added Service for Location-Based Applications, Proceedings of the 21st Int'l. Conference on Data Engineering (ICDE), 2005, Available at http://csdl2.computer.org/comp/proceedings/icde/2005/2285/00/22851100.pdf.

"M-Spatial Maps Out Local Search on O2 i-mode" Available at http://www.lbszone.omc/content/view/709/2, Jan. 25, 2006.

"Telcontar to Enable Advanced Mapping Solutions for Local Matters Inc.", Available at http://telcontar.vnewscenter.com/press.jsp?id=1124478481945, Aug. 23, 2005.

* cited by examiner

TRANSIT-COORDINATED LOCAL SEARCH

BACKGROUND

When a person is interested in locating particular points of interest in certain geographic areas, they can often get on line and conduct a search. For example, if a user is interested in pizza restaurants or coffee shops, they might simply access an Internet search provider and input relevant search terms, such as "pizza shop" and the name of the location relative to which they desire to search. Typically, the search will return a list of results and perhaps the addresses associated with the individual search results. This still requires the user to find their way or route to any of the locations to which they wish to travel.

Consider, for example, an individual in a foreign city who does not have their own transportation. Search results, such as the ones described above, still leave the individual with the burden of finding a way or route to get to the location of interest.

SUMMARY

Various embodiments described below can provide helpful information to a user who is looking for a particular point of interest. In at least some embodiments, first and second searches are conducted. The first search uses a local search provider and produces results which describe one or more points of interest relative to a location, such as the user's current location. Each point of interest can be associated with a destination location to which the user would like to travel. The second search uses a so-called transit route provider and utilizes the results of the first search to plan a transit route between the location and one or more of the respective destination locations.

In at least some embodiments, the transit route provides the user with information that can be useful in helping the user select a particular mode of transit (and route) to reach their intended destination. For example, the transit route might include a listing of bus stops, routes and travel times. Thus, a user can be presented with different travel options for reaching their intended destination.

DETAILED DESCRIPTION

Overview

Various embodiments described below can provide helpful information to a user who is looking for a particular point of interest. In at least some embodiments, first and second searches are conducted. The first search uses a local search provider and produces results which describe one or more points of interest relative to a location, such as the user's current location. Each point of interest can be associated with a destination location to which the user would like to travel. The second search uses a so-called transit route provider and utilizes the results of the first search to plan a transit route between the location and one or more of the respective destination locations.

In at least some embodiments, the transit route provides the user with information that can be useful in helping the user select a particular mode of transit (and route) to reach their intended destination. For example, the transit route might include a listing of bus stops, routes and travel times. Thus, a user can be presented with different travel options for reaching their intended destination.

Exemplary Implementation

Figure 1:
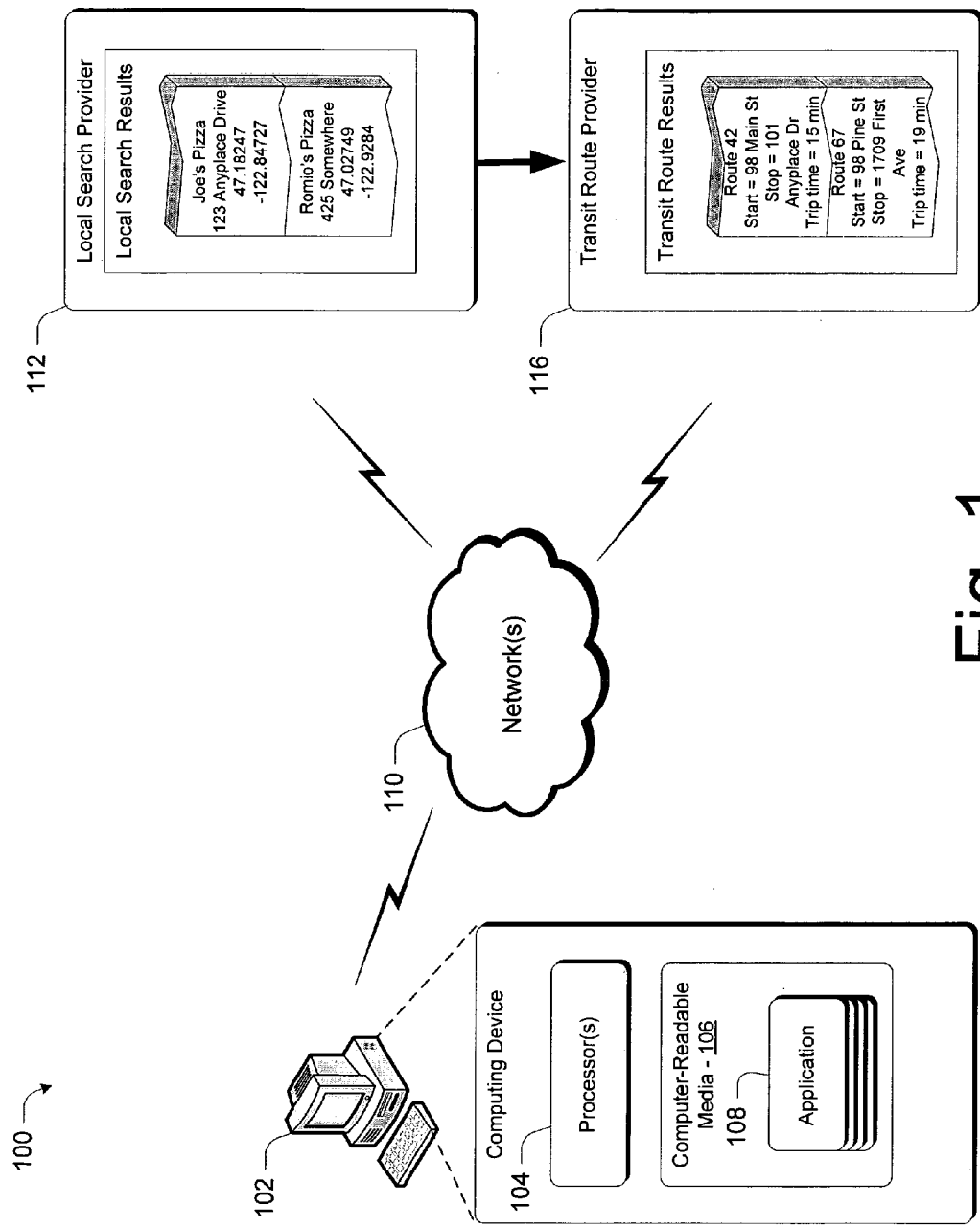
FIG. 1 illustrates a system in which the inventive principles can be employed in accordance with one embodiment.

FIG. 1 illustrates an exemplary system, generally at 100, in which various embodiments described below can be implemented in accordance with one embodiment. These various embodiments can coordinate local search results with transit data to produce relevant search results that can enable a user to make informed decisions on the particular type of transit and route to take to an intended destination.

System 100 includes, in this example, one or more computing devices 102 each of which includes one or more processors 104, one or more computer-readable media 106 and one or more applications 108 that reside on the computer-readable media and which are executable by the processor(s).

Although computing device 102 is illustrated in the form of a desktop computer, it is to be appreciated and understood that other computing devices can be utilized without departing from the spirit and scope of the claimed subject matter. For example, other computing devices can include, by way of example and not limitation, portable computers, handheld computers such as personal digital assistants (PDAs), cell phones and the like. In some implementations, particularly those that utilize handheld computing devices, mobile users are provided with a way to conveniently search and acquire transit route information that can be immediately acted upon. For example, a user in an unfamiliar city who is interested in eating lunch at a pizza parlor can quickly do a search to locate geographically close pizza parlors, and then have transit routes to the pizza parlors selected for their current location. Once imparted with this information, the user can quickly locate a particular conveyance, such as a bus or subway, and be off to their destination.

System 100 also includes at least one network 110 that can be used by computing device 102 to communicate with a local search provider 112 and/or a transit route provider 116. All or part of network(s) 110 can include or make use of the Internet. Although the local search provider and transit route provider are illustrated as remote from computing device 102, it is to be appreciated and understood that one or more of these providers can reside on the computing device itself. In network embodiments, any suitable protocols can be utilized to enable communication between computing device 102, local search provider 112, and transit route provider 116.

In practice, the local search provider 112 is configured to receive input from the user and, responsively, conduct a search to locate places of interest that meet search criteria entered by the user. Examples of local search providers include Internet search providers that search the Internet using well known techniques. For example, a user might be interested in pizza places in their geographic proximity or within the proximity of a location that is provided by the user. By virtue of knowing their location or providing a location, the user can enter search parameters that are then used to find places of interest that are geographically close to the provided location. A location, such as the user's location, can either be entered by the user (as by entering a street or address) or through some other means, such as through GPS input to the computing device, cell node, wireless network node, and the like. There are a number of ways to determine a current location, any of which can be used.

Thus, when a user enters their search criteria, the local search provider can use the search criteria to conduct a search and return a set of results. The set of results pertains to one or more points of interest relative to the location provided by the user. The points of interest can be associated with one or more respective destination locations to which a user wishes to travel either from a current location or a provided location. The search results can include each destination location's geographical proximity to the location provided by the user.

In the example of FIG. 1, the user is interested in pizza shops that are near their current location. Notice here that the user's search criteria has been used by the local search provider to identify two different pizza shops-Joe's Pizza and Romio's Pizza, along with their addresses and other information.

In practice, transit route provider 116 is configured to utilize aspects of the local search's results to develop transit route results which define a transit route(s) lo between the location provided by the user (either their current location or some other location) and one or more of the destination locations identified by the local search. Typically, a transit route provider has access to information that can be utilized to plan routes. For example, many cities have on line, web-accessible sites that can be used to plan a trip from point A to point B. In this case, the transit route provider utilizes the location provided by the user and the destination location(s) to access a database and plan an appropriate transit route.

In the context of this document, a transit provider can include, by way of example and not limitation, a provider of public transit (buses, subways, etc.) or any other scheduled transportation system or mode of conveyance. One characteristic of such modes of conveyance is that they are not typically under the control of the user and they are available for the public at large to use.

Transit route providers can often provide or use real time information that pertains to individual routes to plan potential transit routes between a current location and one or more destination locations. For example, if an accident occurs along a particular route thus slowing traffic, the transit route provider can take this into account when planning routes.

In the FIG. 1 example, the results of the local search describing points of interest or respective destinations (i.e., Joe's Pizza, Romio's Pizza, etc.) have been utilized to search for and identify transit routes between the current location and each respective destination. Specifically, notice that two individual routes have been identified for one or more of the search results—Route 42 and Route 67. Each identified route includes a starting and stopping location, along with an estimated trip time. This information can be utilized by the user to select an appropriate route. For example, if the user is closer to Main Street and in a hurry, they might select Route 42. If, on the other hand, the user is not in a particular hurry, they might select the longer of the routes—Route 67.

Local Search Results and Transit Route Results

Figure 2:
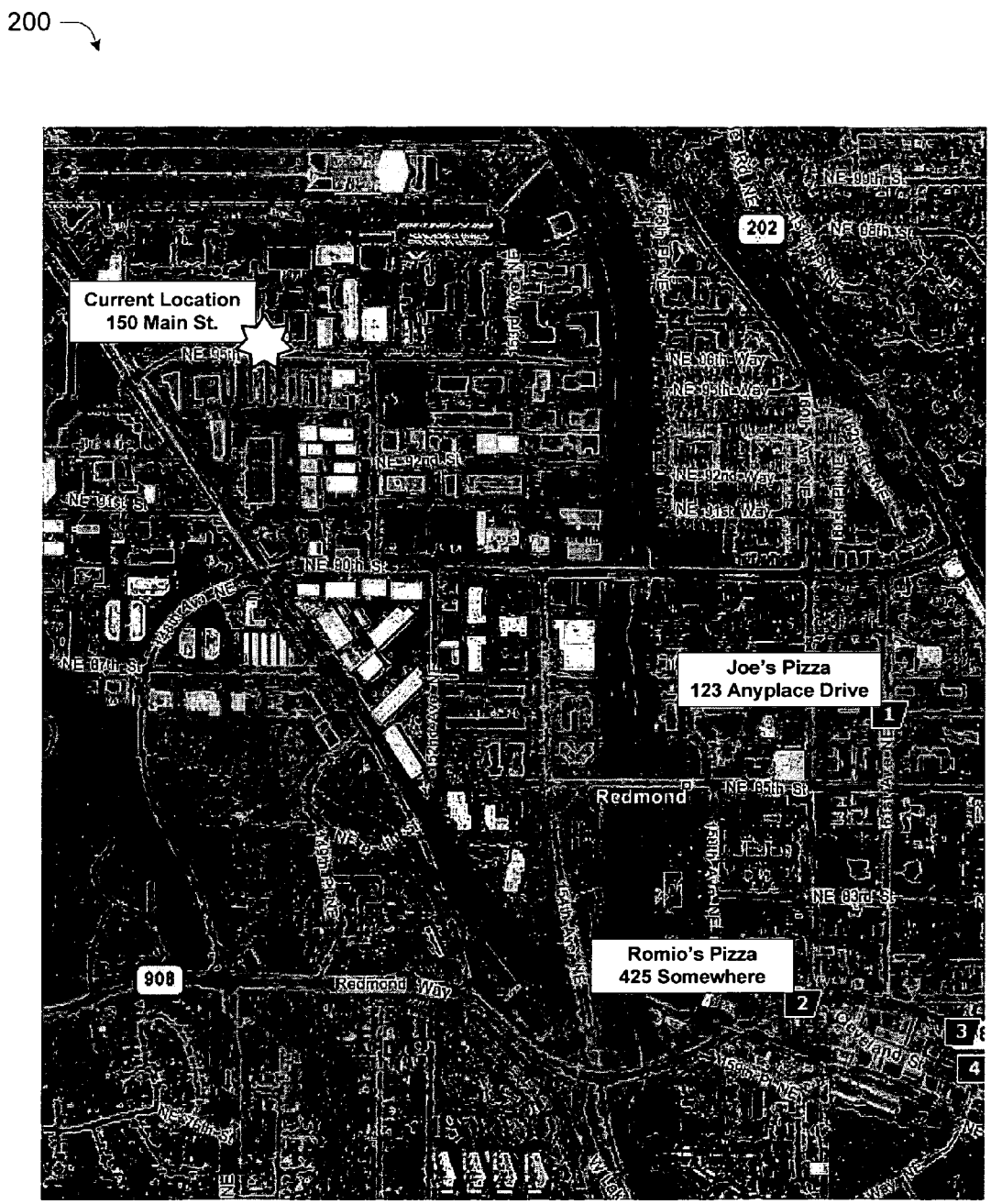
FIG. 2 illustrates an example of search results using a local search provider, in accordance with one embodiment.
Figure 3:
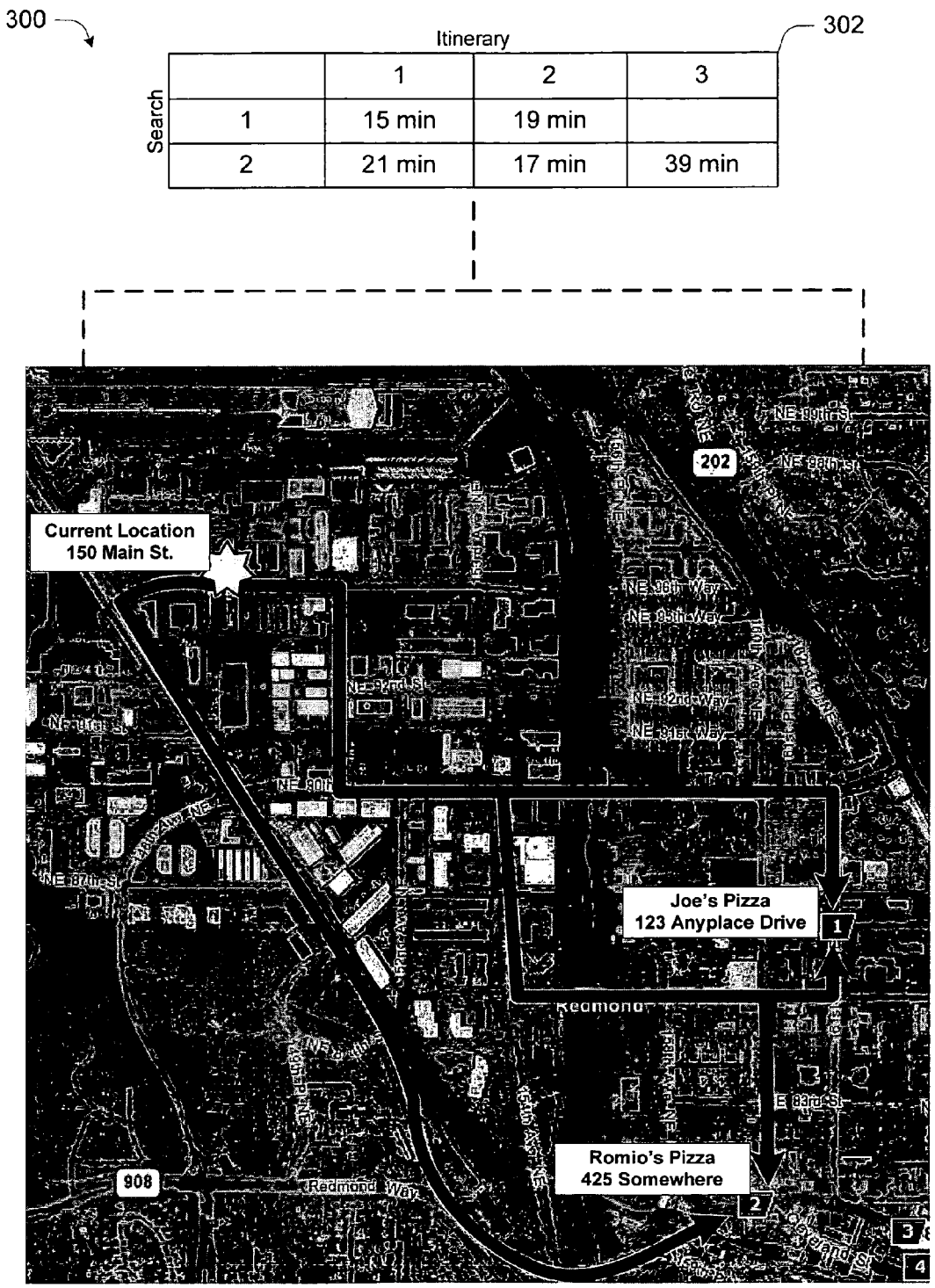
FIG. 3 illustrates a conceptual example of search results using a transit route provider that utilizes local search results, in accordance with one embodiment.

FIGS. 2 and 3 diagrammatically or pictorially represent the type of information available, in accordance with one embodiment, from local search results and transit route results as discussed above regarding FIG. 1. More specifically, FIG. 2 represents an example of search results using a local search provider, and FIG. 3. represents an example of search results using a transit route provider that has utilized local search results provided by the local search provider.

FIG. 2 shows, generally at 200, a pictorial example that represents the local search results obtained from a local search provider in the FIG. 1 example. In this example, these results were obtained by inputting two categorical search terms, i.e. "pizza restaurants" and the city name. Note that various local pizza restaurants, which are points of interest, are shown relative to a current location. Both "Joe's Pizza" (1) and "Romio's Pizza" (2) are labeled for illustrative purposes. Note also that address information for each location is shown or otherwise provided for the user.

However, this information alone may not allow the user to determine which restaurant and/or respective route thereto is most convenient and accessible. Consider again the user who relies on a public transportation or transit system such as a bus, subway, or shuttle service to get to one of the restaurants. Since the system is not under the user's control (e.g. since they cannot physically get into and drive their own car to the destination locations), additional information such as the system's access location(s), departure time(s), physical route(s), number of transfers, etc. is important to the user in determining which restaurant to choose and which route to take. Often, this transit route information is made available by the transit system provider as indicated above.

Consider now FIG. 3 which shows, generally at 300, a pictorial representation of transit route information that has obtained from searching a transit route provider using the local search results described above. Here, the transit routes are illustrated as dark lines.

Table 302 illustrates the specific local pizza restaurants (local search results) coordinated with one or more of their respective itineraries/routes (transit route results). Here, "Joe's Pizza" and "Romio's Pizza" are each shown with two of potentially many respective routes available to a user at the current location. In this example, Search "1" corresponds to Joe's Pizza and Search "2" corresponds to Romio's Pizza.

As noted above, information provided by the transit route provider regarding each of these respective routes is useful in determining which restaurant and respective route is most convenient and accessible. In addition, transit routes can be sorted based on real time route information available from the provider. Thus, the user might see their search results sorted in accordance with actual travel time with due consideration for the actual traffic conditions at the time.

Exemplary Method

Figure 4:
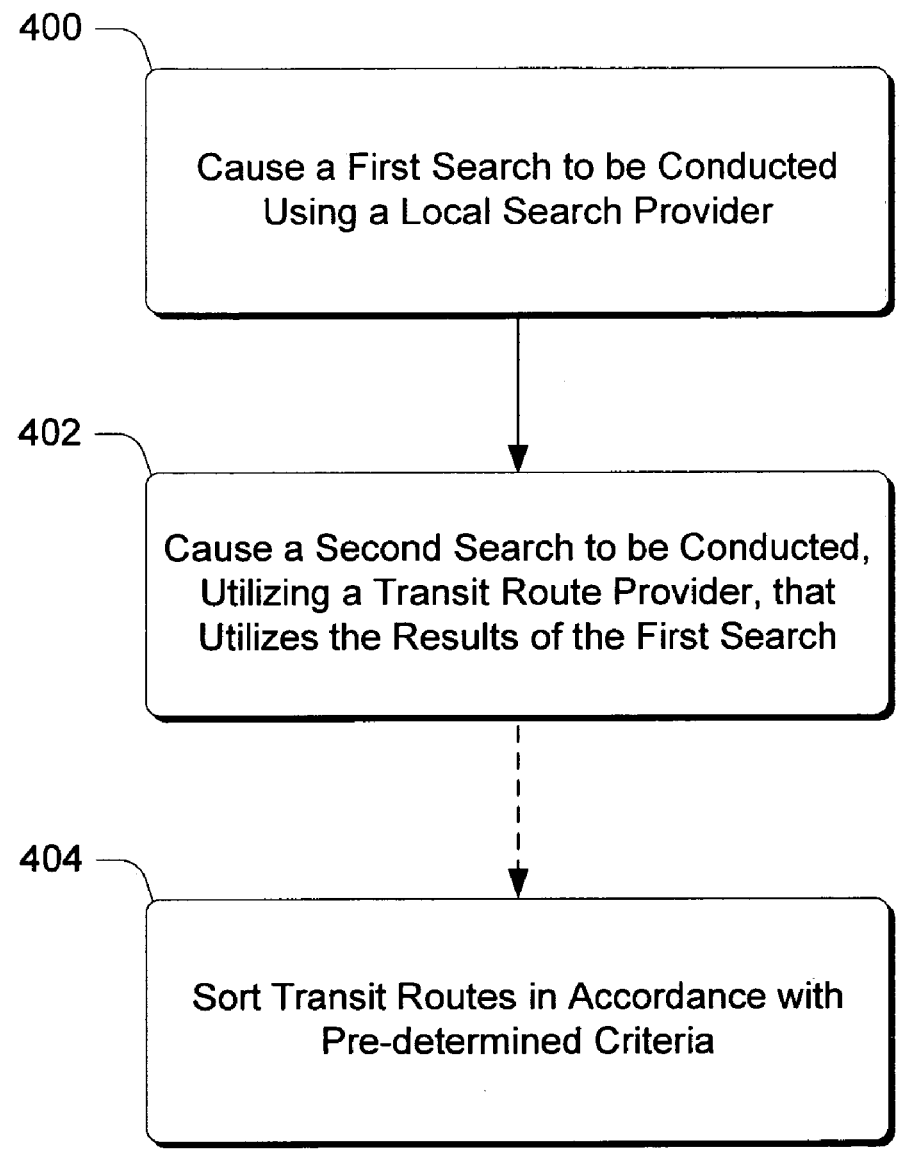
FIG. 4 is a flow diagram that describes steps in a method in accordance with one embodiment.

FIG. 4 is a flow diagram that illustrates steps in a method in accordance with one embodiment. The method can be implemented in connection with any suitable hardware, software, firmware or combination thereof. In one embodiment, the method is implemented in software in the form of computer-executable instructions, such as those defining an application that executes on a client computing device and those executing on behalf of a local search provider and a transit route provider.

Step 400 causes a first search to be conducted using a local search provider. As noted above, the local search provider may be remote from a computing device and the computing device can use one or more networks to communicate with the local search provider. Alternately or additionally, the local search provider can be embodied locally on the computing device. Examples of a first search are given above.

Step 402 causes a second search to be conducted using a transit route provider. This second search can utilize the results of the first local search, described above, to plan a transit route between the current location and one or more of the individual points of interest (potential destination locations). As noted above, the transit route provider may be remote from a computing device and the computing device can use one or more networks, such as the Internet, to communicate with the transit route provider. Alternately or additionally, the transit route provider can be embodied locally on the computing device. Examples of a second search are given above.

Optionally, step 404 can sort the transit routes in accordance with pre-determined criteria. This sorting can be based on real time information that is available to transit route provider, examples of which are provided above. Pre-determined criterion can further include, by way of example and not limitation: distance to travel, time to travel, number of transfers necessary, and the like. In the context of the above example involving pizza restaurants in a certain city, the available transit routes between the current location and each specific pizza restaurant (like "Joe's Pizza" and "Romio's Pizza") can be sorted by criteria that is meaningful to the user in choosing the most convenient or accessible route.

It is to be appreciated and understood that while the local search provider and the transit search provider are depicted as logically different entities, such need not be the case. For example, the functionality provided by both the local search provider and the transit route provider can be provided by a single entity, such as a service, without departing from the spirit and scope of the claimed subject matter.

CONCLUSION

The various embodiments described above provide helpful information to a user looking for a particular point of interest. By having information such as destination locations and available routes to reach the destination locations, users can make timely and informed decisions as to the best mode of travel.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
conducting a first search at a computing device configured to provide transit coordinated local search results, wherein the results of the first search describe a plurality of points of interest relative to a location provided by a user of the computing device, the plurality of points of interest being associated with respective destination locations and the location being different from a current location of the user of the computing device;
conducting a second search at the computing device, that utilizes the results of the first search to provide a plurality of mass transportation public transit routes to each of the plurality of points of interest; and
providing the plurality of mass transportation public transit routes to a display of the computing device, wherein the plurality of mass transportation public transit routes provided to the display are sorted based on specified criteria.

2. The method of claim 1, wherein a local search provider embodied locally on the computing device conducts the first search and a transit route provider embodied locally on the computing device conducts the second search.

3. The method of claim 1, wherein access locations of the plurality of mass transportation public transit routes are provided to the display.

4. The method of claim 1, wherein the criteria includes number of transfers.

5. The method of claim 1, wherein departure times for the plurality of mass transportation public transit routes are provided to the display.

6. The method of claim 1, wherein the sorting is based, at least in part, on real time information that pertains to the mass transportation public transit routes.

7. The method of claim 1, wherein one criterion pertains to the time to travel from the location to a particular destination location using a particular mass transportation public transit route of the plurality of mass transportation public transit routes.

8. The method of claim 1, wherein one criterion pertains to the distance from the location to a particular destination location.

9. One or more computer-readable storage media having computer-readable instructions thereon which, when executed by a computer, implement the method of claim 1.

10. The method of claim 1, wherein the computing device includes a desktop computer, a portable computer, a handheld computer, a personal digital assistant, or a cell phone.

11. One or more computer-readable storage media comprising computer executable instructions that, when executed by a computer, perform acts comprising:
receiving results of a first search, via the Internet, wherein the results of the first search describe one or more points of interest relative to a current location, individual points of interest being associated with respective destination locations;
conducting a second search that utilizes the results of the first search to plan a plurality of mass transportation public transit routes between the current location and each of the one or more of the respective destination locations;
sorting the plurality of mass transportation public transit routes for each of the one or more of the respective destination locations in accordance with pre-determined criteria; and
providing the plurality of mass transportation public transit routes for each of the one or more of the respective destination locations to a computing device that initiated the first search.

12. The one or more computer-readable storage media of claim 11, wherein the sorting is based, at least in part, on real time information that is received and pertains to the plurality of mass transportation public transit routes.

13. The one or more computer-readable storage media of claim 12, wherein said sorting uses at least one criterion that pertains to the time to travel from the current location to a particular destination location using a mass transportation public transit route.

14. The one or more computer-readable storage media of claim 12, wherein said sorting uses at least one criterion that pertains to the distance from the current location to a particular destination location.

15. The one or more computer-readable storage media of claim 11, wherein the plurality of mass transportation public transit routes are provided to the computing device via a network.

16. The one or more computer-readable storage media of claim 11, wherein the results of the first search are received from an Internet search provider.

17. A system comprising:
a computer; and
one or more computer-readable media having computer-readable instructions thereon which, when executed by the computer, cause the computer to:

conduct a first search, via the Internet, using a local search provider, wherein results of the first search describe one or more points of interest relative to a current location, the one or more points of interest being associated with respective destination locations;

conduct a second search, via the Internet, using a transit route provider wherein the second search utilizes the results from the first search to plan a plurality of mass transportation public transit routes between the current location and each of the one or more respective destination locations; and sort one or more of the plurality of mass transportation public transit routes associated with each of the one or more respective destination locations in accordance with pre-determined criteria.

18. The system of claim 17, wherein said sorting is based, at least in part, on real time information that is received and which pertains to the plurality of mass transportation public transit routes.

19. The system of claim 18, wherein one criterion pertains to the time to travel from the current location to a particular destination location using a particular mass transportation public transit route.

20. The system of claim 18, wherein the plurality of mass transportation public transit routes include a bus route, a subway route, or a shuttle service route.

* * * * *